(12) United States Patent
Kamada

(10) Patent No.: US 9,868,851 B2
(45) Date of Patent: Jan. 16, 2018

(54) RUBBER COMPOSITION FOR TIRE TREAD AND PNEUMATIC TIRE

(71) Applicant: TOYO TIRE & RUBBER CO., LTD., Osaka-shi, Osaka (JP)

(72) Inventor: Shinsaku Kamada, Osaka (JP)

(73) Assignee: TOYO TIRE & RUBBER CO., LTD., Osaka (JP)

( * ) Notice: Subject to any disclaimer, the term of this patent is extended or adjusted under 35 U.S.C. 154(b) by 0 days.

(21) Appl. No.: 14/323,328

(22) Filed: Jul. 3, 2014

(65) Prior Publication Data

US 2015/0080493 A1    Mar. 19, 2015

(30) Foreign Application Priority Data

Sep. 18, 2013  (JP) .................................. 2013-193287

(51) Int. Cl.
| | | |
|---|---|---|
| *C08L 9/00* | (2006.01) | |
| *C08L 7/00* | (2006.01) | |
| *B60C 1/00* | (2006.01) | |

(52) U.S. Cl.
CPC .............. *C08L 9/00* (2013.01); *B60C 1/0016* (2013.01); *C08L 7/00* (2013.01); *C08L 2205/03* (2013.01)

(58) Field of Classification Search
CPC combination set(s) only.
See application file for complete search history.

(56) References Cited

U.S. PATENT DOCUMENTS

| | | | |
|---|---|---|---|
| 5,587,411 A | 12/1996 | Sakaki et al. | |
| 6,550,508 B1 * | 4/2003 | Yamaguchi | ............. B60C 11/00 |
| | | | 152/167 |
| 2006/0188716 A1 * | 8/2006 | Takahashi | ................ D02G 3/48 |
| | | | 428/364 |

FOREIGN PATENT DOCUMENTS

| | | | |
|---|---|---|---|
| JP | 04300369 A | * | 10/1992 |
| JP | 05-247855 A | | 9/1993 |
| JP | 10-007841 A | | 1/1998 |
| JP | 2000044598 A | * | 2/2000 |
| JP | 2008-115316 A | | 5/2008 |

OTHER PUBLICATIONS

Machine translation of JP 2008 115316.*
Machine translation of JP 2000-044598 A, retrieved Jan. 2017.*
Abdelmouleh et al., "Short natural-fibre reinforced polyethylene and natural rubber composites: Effect of silane coupling agents and fibres loading", Composites Science and Technology 67 (2007) 1628-1639.*
Jacob et al., "Mechanical properties of sisal/oil palm hybrid fiber reinforced natural rubber composites", Composites Science and Technology 64 (2004) 955-965.*
Office Action dated Dec. 25, 2015, issued in counterpart Chinese Patent Application No. 201410363643.2, with English translation, (10 pages).

* cited by examiner

*Primary Examiner* — Nicole Buie-Hatcher
(74) *Attorney, Agent, or Firm* — Westerman, Hattori, Daniels & Adrian, LLP

(57) ABSTRACT

A rubber composition for a tire tread comprising 100 parts by mass of a diene rubber, 10 to 150 parts by mass of a reinforcing filler, and 0.1 to 30 parts by mass of an acid-treated silk powder having a 90% volume particle diameter (D90) of 500 μm or less. A pneumatic tire having a tread comprising the rubber composition.

5 Claims, No Drawings

RUBBER COMPOSITION FOR TIRE TREAD AND PNEUMATIC TIRE

CROSS-REFERENCE TO RELATED APPLICATIONS

This application is based upon and claims the benefit of priority from the prior Japanese Patent Application No. 2013-193287, filed on Sep. 18, 2013; the entire contents of which are incorporated herein by reference.

BACKGROUND

1. Technical Field

The disclosure relates to a rubber composition used in a tread of a tire and a pneumatic tire using the rubber composition.

2. Related Art

Ice and snow-covered road surface has a friction coefficient remarkably decreased as compared with that of a general road surface, and is slippery. Therefore, in a tread rubber of a tire for winter (winter tire) such as a studless tire or a snow tire, rubber hardness at low temperature is set to a value lower than that of a tire for summer in order to increase ground-contact property on an icy and snowy road surface. Furthermore, to increase on-ice friction force, various methods such as a method of forming a tread rubber using a foamed rubber and a method of blending a hard material such as hollow particles, glass fibers or aluminum whiskers with a rubber are proposed.

For example, JP-A-10-007841 discloses that on-ice frictional performance is improved by a scratch effect by blending vegetable granules obtained by pulverizing seed shells or fruit cores with a rubber. However, the vegetable granules do not have reinforcement, and therefore tend to decrease abrasion resistance performance. For this reason, when the amount of the vegetable granules blended is increased for the purpose of further improving on-ice performance, abrasion resistance performance is deteriorated. Therefore, on-ice performance is desired to be improved while suppressing the deterioration in abrasion resistance performance.

JP-A-2008-115316 discloses that an alkali-treated silk powder together with a filler such as carbon black or silica is blended with a rubber composition for a tire. This document describes that an alkali-treated silk powder is blended with the rubber composition to improve dispersibility of the filler, thereby improving processability, reinforcement and rolling resistance. However, this document is silent on on-ice performance.

SUMMARY

A rubber composition for a tire tread according to an embodiment comprises 100 parts by mass of a diene rubber, 10 to 150 parts by mass of a reinforcing filler, and 0.1 to 30 parts by mass of an acid-treated silk powder having a 90% volume particle diameter (D90) of 500 μm or less. A pneumatic tire according to an embodiment has a tread comprising the rubber composition.

DETAILED DESCRIPTION

The rubber composition according to an embodiment comprises a diene rubber having blended therewith a reinforcing filler and an acid-treated silk powder. When the acid-treated silk powder is blended with the diene rubber, on-ice performance of a tire can be improved while suppressing the deterioration in abrasion resistance performance.

Examples of the diene rubber that can be used as a rubber component in the rubber composition include natural rubber (NR), polyisoprene rubber (IR), polybutadiene rubber (BR), styrene-butadiene rubber (SBR), styrene-isoprene copolymer rubber, butadiene-isoprene copolymer rubber, and styrene-isoprene-butadiene copolymer rubber. Those diene rubbers can be used in one kind alone or as a blend of two or more kinds thereof. The rubber component is preferably natural rubber, polybutadiene rubber, styrene-butadiene rubber, or a blend of two kinds or more of those.

As the diene rubber, a blend of natural rubber and other diene rubber is preferably used, and a blend of natural rubber (NR) and polybutadiene rubber (BR) is particularly preferably used. In this case, when the proportion of BR is too small, low temperature characteristics of a rubber composition are difficult to achieve. On the other hand, when the proportion of BR is too large, processability of a rubber composition tends to deteriorate, and tear resistance of a rubber composition tends to decrease. For this reason, the ratio of NR/BR is 30/70 to 80/20, and preferably about 40/60 to 70/30, in mass ratio.

Carbon black and/or silica are preferably used as the reinforcing filler. That is, as the reinforcing filler carbon black alone, silica alone or a combination of carbon black and silica may be used. Carbon black or a combination of carbon black and silica is preferably used. The amount of the reinforcing filler blended is 10 to 150 parts by mass, preferably 20 to 100 parts by mass, and more preferably 30 to 80 parts by mass, per 100 parts by mass of the diene rubber.

The carbon black is not particularly limited, and the conventional various kinds of carbon black can be used. For example, in the case of using the rubber composition in a tread part of a winter tire such as a studless tire, carbon black having a nitrogen adsorption specific surface area ($N_2SA$) (JIS K6217-2) of 70 to 150 $m^2/g$ and a DBP absorption (JIS K-6217-4) of 100 to 150 ml/100 g is preferably used from the standpoints of low temperature performance and abrasion resistance performance of a rubber composition and reinforcement of a rubber. Specific examples of the carbon black that can be used include SAF class carbon black, ISAF class carbon black and HAF class carbon black. The amount of the carbon black blended is a range of preferably about 10 to 80 parts by mass, and more preferably 15 to 50 parts by mass, per 100 parts by mass of the diene rubber.

The silica is not particularly limited. Wet silica such as silica by a wet precipitation method or silica by a wet gel method is preferably used. BET specific surface area (measured according to a BET method defined in JIS K6430) of the silica is not particularly limited. The BET specific surface area is preferably 90 to 250 $m^2/g$, and more preferably 150 to 220 $m^2/g$. The amount of the silica blended, is preferably 10 to 50 parts by mass, and more preferably 15 to 50 parts by mass, per 100 parts by mass of the diene rubber, from the standpoints of the balance of tan δ of a rubber, reinforcement, and the like.

In the case of blending silica, a silane coupling agent such as sulfide silane or mercaptosilane is preferably used together with the silica. The amount of the silane coupling agent blended is preferably 2 to 20 mass % based on the mass of the silica blended.

Silk powder treated with an acid (that is, an acid-treated silk powder) is blended with the rubber composition according to the present embodiment. A product obtained by the following method is used as the acid-treated silk powder. A silk raw material before degumming (that is, a silk raw material not yet degummed or refined) is acid-treated without conducting an alkali treatment, and then the acid-treated material is pulverized. In more detail, a silk raw material which is not degummed, such as a cocoon, a raw silk yarn or a cocoon filament is dipped in an acidic solution (for example, pH is 2.1 or lower at ordinary temperature) such as hydrochloric acid or sulfuric acid, embrittled by subjecting the silk raw material to an acid treatment which heats under acidity, and then neutralized with an alkali (pH=6.5 to 7.5). The embrittled material after the neutralization is washed with water, dried, and then pulverized using a pulverizer such as a hummer mill or a vibration mill. Thus, an acid-treated silk powder is obtained.

In general, the silk raw material has a structure that fibroin becoming silk is surrounded with sericin, and the sericin is removed by conducting degumming such as an alkali treatment. Therefore, in an alkali-treated silk powder, sericin that is a protein is not present on the surface thereof. On the other hand, the acid-treated silk powder is a silk powder embrittled by an acid treatment, has sericin on the surface thereof and has fibroin that is a protein, inside the sericin. Sericin contains large amounts of serine and aspartic acid as its amino acid components, and therefore has —OH and —COOH derived from those in a side chain. Besides those, the sericin has basic —$NH_2$ derived from basic amino acid such as arginine, lysine or histidine. Furthermore, fibroin contains large amounts of glycine, alanine, serine and tyrosine as its amino acid components, and therefore has —$CH_3$, —$CH_2OH$ and —$CH_2$—$C_6H_4$—OH derived from those in a side chain. It is considered that due to those side chain structures, when an acid-treated silk powder is used, compatibility into a rubber is improved, dispersibility of the reinforcing filler is improved, and as a result, reinforcing performance is exhibited. As a result, abrasion resistance performance can be suppressed from deteriorating. Furthermore, when the acid-treated silk powder is used, it is considered that a water screen removal effect on an ice-covered road surface is exhibited by a hydrophilic group (—OH, —COOH or the like) of sericin and fibroin together with fine pores present in fibroin (that is, a hollow or porous structure of fibroin itself). As a result, on-ice performance can be improved.

Furthermore, because the silk powder is embrittled by an acid treatment, a powder having small particle diameter is obtained by the pulverization. For this reason, the silk powder can be finely dispersed in the diene rubber, and the interaction with the dine rubber and the like can be enhanced. As a result, abrasion resistance performance can be improved.

The particle diameter of the acid-treated silk powder is preferably 500 μm or less, more preferably 300 μm or less, still more preferably 100 μm or less, and particularly preferably 30 μm or less, in terms of a 90% volume particle diameter (D90), from the standpoint of suppressing abrasion resistance performance from deteriorating. The lower limit of the particle diameter of the acid-treated silk powder is not particularly limited, but is preferably 0.1 μm or more, more preferably 1 μm or more, and still more preferably 5 μm or more, from the standpoint of enhancing the effect of improving on-ice performance. In the present description, the D90 means a particle diameter at integrated value 90% in a particle size distribution (volume basis) measured by a laser diffraction and scattering method.

The contents of fibroin and sericin in the acid-treated silk powder are not particularly limited. Generally, in a silk raw material before an acid treatment, mass ratio of those is fibroin:sericin=about 75:about 25. Because sericin is removed by the alkali treatment, this ratio greatly changes. However, in the acid treatment, the amounts of fibroin and sericin eluted are small, and the ratio between those does not greatly change. In other words, although the acid treatment is a deterioration treatment for pulverizing a silk raw material, sericin that is removed by the alkali treatment can be maintained. Therefore, the contents of fibroin and sericin in the acid-treated silk powder according to the present embodiment are preferably that the content of fibroin is 70 to 85 mass % and the content of sericin is 30 to 15 mass %.

The acid-treated silk powder may be subjected to a surface treatment for improving adhesiveness to a rubber. Specifically, the silk powder obtained by acid-treating a silk raw material before degumming and then pulverizing the acid-treated material is surface-treated using a resin solution of an improving agent of adhesiveness to a rubber, and the surface-treated silk powder may be blended as the acid-treated silk powder with a rubber composition. The effect of improving abrasion resistance performance and on-ice performance can be enhanced by applying the acid-treated silk powder to a surface treatment for improving adhesiveness to a rubber.

Examples of the improving agent of adhesiveness to a rubber include a material comprising a mixture of a resorcin-formalin resin precondensate and a latex, as a main component (RFL solution). The detail including a treatment method is disclosed in JP-A-10-7841, the entire contents of which are incorporated herein by reference, and materials disclosed therein can be similarly used in the present embodiment. The amount of the improving agent of adhesiveness to a rubber adhered to the acid-treated silk powder is not particularly limited. For example, the amount can be 1 to 5 mass %.

Specifically, the RFL solution is obtained as follows. Resorcin and formalin or hexamethylene aldehyde are dissolved in water in the proportion of 1 to 2 mol of formalin or hexamethylene aldehyde per 1 mol of resorcin, and a small amount of a sodium hydroxide or potassium hydroxide aqueous solution is added to the resulting solution, followed by aging. Resorcin-formalin resin precondensate thus obtained is added to and mixed with a natural rubber latex, a diene synthetic rubber latex or a mixture of those, in the proportion of 10 to 80 parts by mass per 100 parts by mass of the latex, in terms of a solid content.

The amount of the acid-treated silk powder blended is 0.1 to 30 parts by mass per 100 parts by mass of the diene rubber. When the amount is 0.1 parts by mass or more, the effects described above can be sufficiently developed. Furthermore, when the amount is 30 parts by mass or less, deterioration in abrasion resistance performance can be suppressed. The amount of the acid-treated silk powder blended is preferably 0.5 to 15 parts by mass, and more preferably 1 to 10 parts by mass, per 100 parts by mass of the diene rubber.

In addition to the acid-treated silk powder, vegetable granules may be blended with the rubber composition according to the present invention. When the vegetable granules are concurrently used with the acid-treated silk powder, on-ice performance can be further improved by scratching effect of the vegetable granules.

Examples of the vegetable granules include pulverized products of seed shells, fruit cores (that is, fruit stones), grains and grain cores. At least one kind of those vegetable granules can be blended with the rubber composition. Examples of the vegetable granules include pulverized products of fruit cores and seed shells, such as walnut, apricot, camellia, peach, plum (Japanese apricot), ginkgo nut, peanuts and chestnut; pulverized products of grains such as rice, wheat, foxtail millet, Japanese millet and corn; and pulverized products of grain cores such as ear cores of corn. Those have Mohs hardness of about 2 to 5, and is harder than ice. Therefore, those vegetable granules can exhibit scratch effect to an ice and show-covered road surface.

As the vegetable granule, a vegetable granule surface-treated with a resin solution of an improving agent of adhesiveness to a rubber is preferably used in order to improve adaptability with a rubber and prevent falling. Examples of the improving agent of adhesiveness to a rubber include the RFL solution described above.

The particle diameter of the vegetable granules is not particularly limited. To exhibit scratch effect and prevent falling from a tread, a 90% volume particle diameter (D90) is preferably 100 to 600 µm, more preferably 150 to 500 µm, and still more preferably 200 to 400 µm.

In addition to the acid-treated silk powder, a pulverized product of a porous carbide of a plant may be blended with the rubber composition according to the present embodiment. When the pulverized product is blended with the rubber composition, water absorption and water removal effects of water screen that occur on an ice-covered road surface are enhanced, and on-ice performance can be further improved.

The pulverized product of the porous carbide is obtained by pulverizing a porous substance comprising a solid product comprising, as a main component, carbon obtained by carbonizing a plant such as a tree or bamboo, as a raw material. Of those, a pulverized product of bamboo charcoal (bamboo charcoal pulverized product) is preferably used from the standpoint of water absorption and water removal effects. Examples of bamboo material becoming a raw material of bamboo charcoal include various bamboos such as Moso bamboo, Japanese timber bamboo, Henon bamboo and Leopard bamboo, and further include bamboo grasses such as Chidori bamboo grass and Sendai bamboo grass. The bamboo charcoal pulverized product can be obtained as follows. A bamboo material is baked and carbonized in a kiln to obtain a bamboo charcoal, and the bamboo charcoal obtained is pulverized into a powder using the conventional pulverizer.

The particle diameter of the pulverized product of the porous carbide is not particularly limited. 90% Volume particle diameter (D90) is preferably 10 to 500 µm, more preferably 50 to 300 µm, and still more preferably 50 to 200 µm.

In the case of blending the vegetable granules and/or a pulverized product of the porous carbide with the rubber composition, the total amount of those blended is preferably 1 to 20 parts by mass, and more preferably 2 to 10 parts by mass, per 100 parts by mass of the diene rubber. The amount of the vegetable granules blended is preferably 0.5 to 10 parts by mass, and more preferably 1 to 5 parts by mass, per 100 parts by mass of the diene rubber. The amount of the pulverized product of the porous carbide blended is preferably 0.5 to 10 parts by mass, and more preferably 1 to 5 parts by mass, per 100 parts by mass of the diene rubber.

Polymer gel that is a crosslinked dine polymer particle may be further blended with the rubber composition according to the present embodiment. For example, when a polymer gel having a glass transition temperature Tg (measurement value by DSC in a temperature rising rate of 20° C./min according to JIS K7121) of −90 to −30° C. is blended, elastic modulus at low temperature of a matrix rubber can be decreased. As a result, adhesive friction force to an ice and snow-covered road surface can be enhanced by the increase in ground contact area. The polymer gel is a gelled rubber that can be produced by crosslinking a rubber dispersion, and examples of a base polymer include various diene rubbers such as BR, SBR, NR and IR. The amount of the polymer gel blended can be, for example, 1 to 50 parts by mass, per 100 parts by mass of the diene rubber. The preferred amount of polymer gel is 5 to 25 parts by mass. The commercially available polymer gel is, for example, NANOPRENE (trade name) manufactured by LANXESS, and can be used in the present embodiment.

In addition to each component described above, compounding chemicals such as process oil, zinc flower, stearic acid, softener, plasticizer, wax, age resister (amine-ketone type, aromatic secondary amine type, phenol type, imidazole type and the like), vulcanizing agent and vulcanization accelerator (guanidine type, thiazol type, sulfenamide type, thiuram type and the like) that are used in general rubber industries can be appropriately blended in the ordinary ranges with the rubber composition of the present embodiment.

Examples of the vulcanizing agent include sulfur components such as powdered sulfur, precipitated sulfur, colloidal sulfur, insoluble sulfur, and high dispersible sulfur. Although not particularly limited, the amount of the vulcanizing agent blended is preferably 0.1 to 10 parts by mass, more preferably 0.5 to 5 parts by mass, and still more preferably 1 to 3 parts by mass, per 100 parts by mass of the diene rubber. The amount of the vulcanization accelerator blended is preferably 0.1 to 7 parts by mass, and more preferably 0.5 to 5 parts by mass, per 100 parts by mass of the diene rubber.

The rubber composition can be prepared by kneading according to the conventional method using a mixing machine such as Banbury mixer, kneader or rolls, generally used. Specifically, in a first mixing stage (non-processing kneading process), other additives excluding a vulcanizing agent and a vulcanization accelerator together with a reinforcing filler and an acid-treated silk powder are added to the diene rubber, and the resulting mixture is kneaded. A vulcanizing agent and a vulcanization accelerator are added to the mixture obtained, followed by kneading, in a final kneading stage (processing kneading process). Thus, a rubber composition can be prepared.

The rubber composition thus obtained is used in a tread rubber constituting a ground contact surface of a pneumatic tire. More preferably, the rubber composition is used as a rubber composition for a tread of a winter tire such as a studless tire or a snow tire. The tread can be formed by vulcanization molding the rubber composition at, for example, 140 to 180° C. according to the conventional method. A tread rubber of a pneumatic tire includes a tread rubber having a two-layered structure comprising a cap rubber and a base rubber and a tread rubber having a single-layered structure comprising those that are integrated. In the present embodiment, the rubber composition is used in a rubber constituting a ground contact area of a tire. Therefore, in a tread rubber having a single-layered structure, the tread rubber comprises the rubber composition, and in a tread rubber having a two-layered structure, the cap rubber comprises the rubber composition.

Example

The present invention is described in detail below by reference to the following examples, but it should be understood that the invention is not construed as being limited to those examples.

Banbury mixer was used. According to the formulations (parts by mass) shown in Table 1 below, components excluding sulfur and a vulcanization accelerator were mixed in a first mixing stage (discharge temperature: 160° C.), and sulfur and a vulcanization accelerator were added to and mixed with the thus-obtained mixture in a final mixing stage (discharge temperature: 90° C.). Thus, a rubber composition for a tire tread was prepared. The detail of each component in Table 1 is as follows.

NR: RSS#3

BR: "BR01" (cis 1,4-bond content: 95%) manufactured by JSR Corporation

Carbon black: "SEAST KH (N339)" ($N_2SA$: 93 $m^2/g$, DBP: 119 ml/100 g) manufactured by Tokai Carbon Co., Ltd.

Silica: "NIPSIL AQ" (BET: 205 $m^2/g$) manufactured by Tosoh Silica Corporation

Silane coupling agent: "Si75" manufactured by DEGUSSA

Paraffin oil: "JOMO PROCESS P200" manufactured by JX Nippon Oil & Energy Corporation Stearic acid: "LUNAC S-20" manufactured by Kao Corporation Zinc flower: "Zinc Flower Grade 1" manufactured by Mitsui Mining & Smelting Co., Ltd.

Age resister: "ANTIGEN 6C" manufactured by Sumitomo Chemical Co., Ltd.

Wax: "OZOACE 0355" manufactured by Nippon Seiro Co., Ltd.

Vulcanization accelerator: "SOXINOL CZ" manufactured by Sumitomo Chemical Co., Ltd.

Sulfur: "Powdered Sulfur" manufactured by Tsurumi Chemical Industry Co., Ltd.

Acid-Treated Silk Powder 1:

Japanese tussore cocoons were boiled in a 0.5 mass % hydrochloric acid aqueous solution at 95° C. for 2 hours, neutralized with sodium carbonate (pH: 6.5 to 7.5), washed with water, and then dried at 100° C. for 1 hour. After drying, the treated material was pulverized to a size of 30 μm with a hummer mill, and further pulverized to a size of 30 μm with a vibration mill. The resulting powder was passed through a 30 μm mesh to obtain acid-treated silk powder 1. The powder obtained had D90 of 25 μm. Even in the case of acid treating with a 0.5 mass % sulfuric acid aqueous solution in place of the 0.5 mass % hydrochloric acid aqueous solution, the same result was obtained.

Acid-Treated Silk Powder 2:

Acid-treated silk powder 2 was obtained in the same manner as in the acid-treated silk powder 1, except that after pulverizing with a hummer mill, the powder obtained was pulverized to a size of 5 μm with a vibration mill and the powder thus obtained was passed through a 5 μm mesh. The powder obtained had D90 of 3 μm.

Acid-Treated Silk Powder 3:

Acid-treated silk powder 3 was obtained in the same manner as in the acid-treated silk powder 1, except that after pulverizing to a size of 300 μM with a hummer mill, the powder obtained was passed through a 300 μm mesh without pulverizing with a vibration mill. The powder obtained had D90 of 220 μm.

Acid-Treated Silk Powder 4:

Acid-treated silk powder 4 was obtained in the same manner as in the acid-treated silk powder 1, except that after pulverizing to a size of 1,000 μm with a hummer mill, the powder obtained was passed through a 1,000 μm mesh without pulverizing with a vibration mill. The powder obtained had D90 of 880 μm.

Acid-Treated Silk Powder 5:

The acid-treated silk power 1 obtained above was immersed in a surface-treating agent for improving adhesiveness to a rubber, dried under heating, and then pulverized to a size of 30 μm with a vibration mill. The powder thus obtained was passed through a 30 μm mesh. Thus, acid-treated silk powder 5 having been subjected to a surface treatment for improving adhesiveness to a rubber was obtained. The powder obtained had D90 of 25 μm. The surface-treating agent described in Example 1 at paragraph 0015 of JP-10-007841 was used as the surface-treating agent for improving adhesiveness to a rubber. In detail, the treating agent was obtained by mixing 353 parts by mass of water, 17 parts by mass of resorcin, 25 parts by mass of 37% formalin, and 5 parts by mass of 10% sodium hydroxide aqueous solution, stirring the resulting solution at a temperature of 20° C. for 12 hours, adding 260 parts by mass of a vinyl pyridine latex (trade name "PYRATEX SNX 7046" manufactured by Sumika ABS Latex Co., Ltd.) and 90 parts by mass of a styrene-butadiene latex (trade name "J-9049" manufactured by Sumika ABS Latex Co., Ltd.) to the solution, and adding water to the resulting mixture to adjust a solid content concentration to 18 mass %.

Alkali-Treated Silk Powder:

Japanese tussore cocoons were boiled in 0.5 mass % sodium carbonate aqueous solution at 95° C. for 2 hours, neutralized with hydrochloric acid (pH: 6.5 to 7.5), washed with water, and then dried at 100° C. for 1 hour. After drying, the treated material was pulverized with a hummer mill, and further pulverized with a vibration mill. The resulting powder was passed through a 50 μm mesh to obtain an alkali-treated silk powder. The powder obtained had D90 of 36 μm. In the case of the alkali treatment, even though the powder was pulverized with a vibration mill, the powder was difficult to be further pulverized to a small particle diameter as in the acid treatment.

Bamboo Charcoal Pulverized Product:

Bamboo charcoal pulverized product (D90:100 μm) obtained by pulverizing bamboo charcoal of Moso bamboo ("#1 Charcoal" manufactured by Miyazaki Doko Co., Ltd.) with a hummer mill and classifying the pulverized product with a sieve (120 mesh)

Vegetable Granules:

Product (D90 of vegetable granules after treatment: 300 μm) obtained by subjecting a pulverized product of walnut shell ("SOFT GRID #46" manufactured by Nippon Walnut Co., Ltd.) to a surface treatment using the above-described surface-treating agent for improving adhesiveness to a rubber according to the method described in paragraph 0015 of JP-A-10-007841

The 90% volume particle diameter (D90) was measured by a laser diffraction particle size analyzer "SALD-2200" manufactured by Shimadzu Corporation using red semiconductor laser (wavelength: 680 nm) as a light source, and a particle diameter at an integrated value 90% in a particle size distribution (volume basis) obtained by the measurement was obtained.

Hardness of each rubber composition obtained was measured. A studless tire was manufactured using each rubber composition. A tire was manufactured such that a tire size was 195/65R15, each rubber composition was applied to its tread, and the rubber composition was vulcanization molded according to the conventional method. Abrasion resistance performance and on-ice braking performance of each tire obtained were evaluated (rim used: 15×5.5 JJ). Each measurement and evaluation method is as follows.

Hardness:

Hardness at ordinary temperature (23° C.) of a test piece (thickness: 12 mm or more) vulcanized at 150° C. for 30 minutes was measured by durometer type A according to JIS K6253.

Abrasion Resistance Performance:

Four tires obtained above were mounted to a 4WD car of 2000 cc, and the car was driven in a distance of 10,000 km while making right and left rotation of the four tires every 2,500 km on an ordinary dry road surface. Average value of residual groove depth in four treads after running was indicated by an index as Comparative Example 1 being 100. The abrasion resistance performance is good as the numerical value is large.

On-Ice Braking Performance:

Four tires obtained above were mounted to a 4WD car of 2000 cc, ABS was operated from 40 km/hr running on an ice floe road (air temperature: —3±3° C.), and braking distance was measured (average value of n=10). The inverse number of the braking distance was indicated by an index as the value of Comparative Example 1 being 100. Larger index means that the braking distance is shorter and braking performance on an ice-covered road surface is more excellent.

using the acid-treated silk powder and the vegetable granules and/or bamboo charcoal pulverized product. From the comparison between Example 9 and Example 10, further improvement effect was obtained in on-ice performance by applying the surface treatment for improving adhesiveness to a rubber to the acid-treated silk powder, and the abrasion resistance was also improved.

INDUSTRIAL APPLICABILITY

The rubber composition of the present invention can be used in various tires of passenger cars, light duty trucks, trucks and buses.

What is claimed is:

1. A rubber composition for a tire tread comprising 100 parts by mass of a diene rubber, 10 to 150 parts by mass of a reinforcing filler, and 0.1 to 30 parts by mass of an acid-treated silk powder having a 90% volume particle diameter (D90) of 500 μm or less, wherein the acid-treated silk powder is a powder obtained by acid-treating a silk raw material without conducting an alkali treatment before said acid-treatment,

TABLE 1

| Formulation (parts by mass) | Com. Ex. 1 | Com. Ex. 2 | Com. Ex. 3 | Com. Ex. 4 | Ex. 1 | Ex. 2 | Ex. 3 | Ex. 4 | Ex. 5 | Com. Ex. 5 | Ex. 6 | Ex. 7 | Com. Ex. 6 | Ex. 8 | Ex. 9 | Ex. 10 |
|---|---|---|---|---|---|---|---|---|---|---|---|---|---|---|---|---|
| NR | 50 | 50 | 50 | 50 | 50 | 50 | 50 | 50 | 50 | 50 | 50 | 50 | 50 | 50 | 50 | 50 |
| BR | 50 | 50 | 50 | 50 | 50 | 50 | 50 | 50 | 50 | 50 | 50 | 50 | 50 | 50 | 50 | 50 |
| Carbon black | 25 | 25 | 25 | 25 | 25 | 25 | 25 | 25 | 25 | 25 | 25 | 25 | 25 | 25 | 25 | 25 |
| Silica | 25 | 25 | 25 | 25 | 25 | 25 | 25 | 25 | 25 | 25 | 25 | 25 | 25 | 25 | 25 | 25 |
| Silane coupling agent | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Paraffin oil | 20 | 20 | 20 | 20 | 20 | 20 | 20 | 20 | 20 | 20 | 20 | 20 | 20 | 20 | 20 | 20 |
| Acid-treated silk powder 1 | | | | | 5 | 0.1 | 1 | 15 | 30 | 50 | | | | 5 | 3 | |
| Acid-treated silk powder 2 | | | | | | | | | | | 5 | | | | | |
| Acid-treated silk powder 3 | | | | | | | | | | | | 5 | | | | |
| Acid-treated silk powder 4 | | | | | | | | | | | | | 5 | | | |
| Acid-treated silk powder 5 | | | | | | | | | | | | | | | | 3 |
| Alkali-treated silk powder | | | | 5 | | | | | | | | | | | | |
| Bamboo charcoal pulverized product | | 5 | | | | | | | | | | | | | 3 | 3 |
| Vegetable granules | | | 5 | | | | | | | | | | | 5 | 3 | 3 |
| Stearic acid | 2 | 2 | 2 | 2 | 2 | 2 | 2 | 2 | 2 | 2 | 2 | 2 | 2 | 2 | 2 | 2 |
| Zinc flower | 2 | 2 | 2 | 2 | 2 | 2 | 2 | 2 | 2 | 2 | 2 | 2 | 2 | 2 | 2 | 2 |
| Age resister | 2 | 2 | 2 | 2 | 2 | 2 | 2 | 2 | 2 | 2 | 2 | 2 | 2 | 2 | 2 | 2 |
| Wax | 2 | 2 | 2 | 2 | 2 | 2 | 2 | 2 | 2 | 2 | 2 | 2 | 2 | 2 | 2 | 2 |
| Vulcanization accelerator | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Sulfur | 2.1 | 2.1 | 2.1 | 2.1 | 2.1 | 2.1 | 2.1 | 2.1 | 2.1 | 2.1 | 2.1 | 2.1 | 2.1 | 2.1 | 2.1 | 2.1 |
| Hardness | 51 | 50 | 50 | 50 | 50 | 50 | 50 | 52 | 54 | 54 | 50 | 52 | 55 | 51 | 52 | 52 |
| Abrasion resistance performance (Index) | 100 | 97 | 96 | 99 | 121 | 102 | 104 | 112 | 100 | 85 | 125 | 103 | 85 | 117 | 112 | 115 |
| On-ice breaking performance (Index) | 100 | 110 | 110 | 96 | 119 | 102 | 104 | 122 | 125 | 125 | 117 | 115 | 113 | 130 | 132 | 139 |

The results are shown in Table 1. In each example in which the acid-treated silk powder was blended, on-ice performance could be dramatically improved while improving abrasion resistance performance or while maintaining the same or more abrasion resistance performance, as compared with Comparative Example 1 that is control. On the other hand, in Comparative Example 4 in which the alkali-treated silk powder was used, improvement effect was not obtained in abrasion resistance performance and on-ice performance. In Comparative Example 5, the amount of the acid-treated silk powder blended is too large, and in Comparative Example 6, the particle diameter of the acid-treated silk powder used is too large. As a result, abrasion resistance performance was deteriorated in Comparative Examples 5 and 6. As shown in Examples 8 and 9, further improvement effect was obtained in on-ice performance by concurrently wherein the acid-treated silk powder is a silk powder embrittled by an acid treatment, and has sericin on the surface thereof and fibroin inside the sericin, the content of sericin in the acid-treated silk powder is 30 to 15 mass %, and the content of fibroin in the acid-treated silk powder is 70 to 85 mass %, wherein the acid-treated silk powder is a silk powder obtained by applying a surface treatment for improving adhesiveness to a rubber to the acid-treated silk powder, and wherein the surface treatment for improving adhesiveness to a rubber is a surface treatment using an improving agent of adhesiveness comprising a resorcin-formalin resin precondensate and a latex.

2. The rubber composition for a tire tread according to claim 1, wherein said acid-treatment is carried out to the silk raw material which is not degummed, and further comprises pulverizing the acid-treated material.

3. The rubber composition for a tire tread according to claim 1, further comprising vegetable granules and/or a pulverized product of a porous carbide of a plant in the total amount of 1 to 20 parts by mass per 100 parts by mass of the diene rubber.

4. A pneumatic tire having a tread comprising the rubber composition according to claim 1.

5. The rubber composition for a tire tread according to claim 1, wherein said acid-treatment is a treatment which heats the silk raw material in an acidic solution.

* * * * *